United States Patent [19]

Auler et al.

[11] 3,709,470
[45] Jan. 9, 1973

[54] FLOATING SURFACE AERATOR

[75] Inventors: Herbert Auler, Michelbacher Hutte; Josef Muskat, Michelbach, both of Germany

[73] Assignee: Passavant Werke, Hutte, Germany

[22] Filed: Oct. 23, 1969

[21] Appl. No.: 868,747

[30] Foreign Application Priority Data

Nov. 7, 1968   Austria..........................A 10814/68

[52] U.S. Cl. ....................261/91, 261/120, 210/242
[51] Int. Cl. ..............................................B01f 3/04
[58] Field of Search.......261/91, 83, 84, 36, DIG. 71, 261/120; 259/95, 96; 260/194, 197, 219, 220, 221, 14, 15; 239/17; 210/242

[56] References Cited

UNITED STATES PATENTS

| 2,061,564 | 11/1936 | Drake et al. | 261/84 X |
|---|---|---|---|
| 2,063,301 | 12/1936 | Durdin, Jr. | 261/83 |
| 2,072,944 | 3/1937 | Durdin | 261/DIG. 71 |
| 2,271,446 | 1/1942 | Unger, Jr. | 261/DIG. 71 |
| 3,235,877 | 2/1966 | Grob | 239/17 |
| 3,462,132 | 8/1969 | Kaelin | 261/87 |
| 3,515,375 | 6/1970 | Roos | 259/95 |
| 3,539,158 | 11/1970 | Roos | 261/36 |
| 3,548,770 | 12/1970 | Boutros | 261/120 X |

FOREIGN PATENTS OR APPLICATIONS 1,365,156   5/1964   France ...........................261/84

Primary Examiner—Tim R. Miles
Attorney—Larson, Taylor and Hinds

[57] ABSTRACT

A floating surface aerating apparatus having most of its weight supported by a buoyant body, preferably annular in shape, immersed in liquid below the level of the surface flow created by the aerating apparatus, and including smaller stabilizing floats located on the surface radially outwardly of the aerating means. The buoyant body and the floats may be designed to facilitate liquid flow and a baffle arrangement may be provided in the vicinity of the buoyant body to influence upward flow of liquid to the aerating apparatus.

9 Claims, 6 Drawing Figures

PATENTED JAN 9 1973 3,709,470
SHEET 3 OF 3
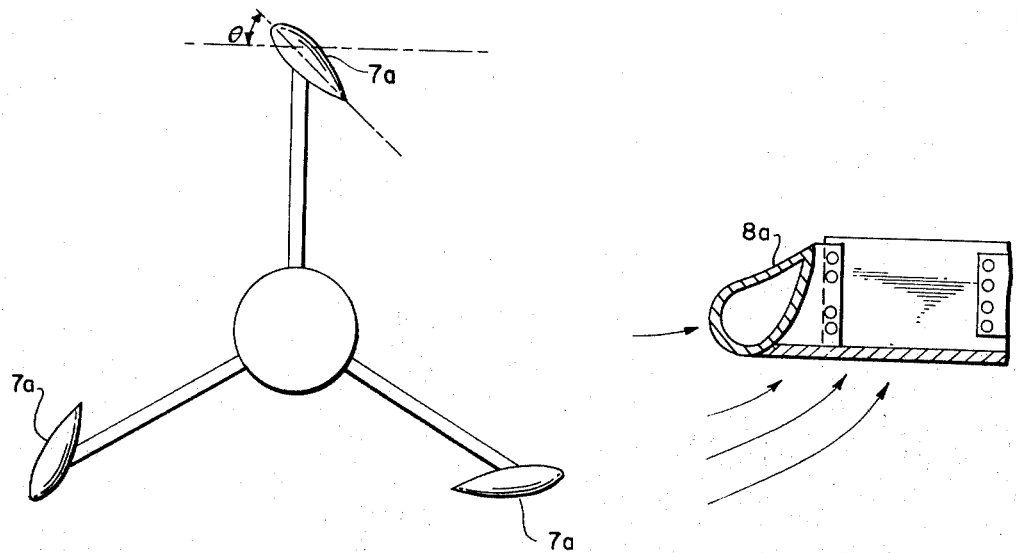
FIG. 3
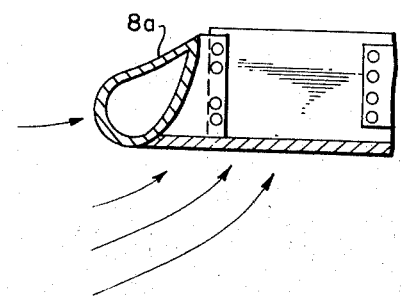
FIG. 4
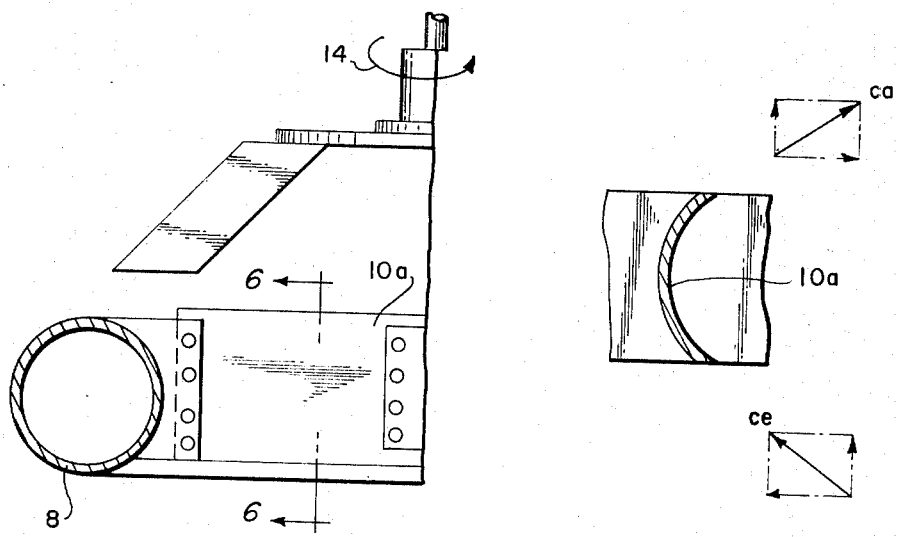
FIG. 5
FIG. 6
INVENTORS
HEBERT AULER
JOSEF MUSKAT
BY Larson and Taylor
ATTORNEYS

FLOATING SURFACE AERATOR

BACKGROUND OF THE INVENTION

This invention relates to an aerating apparatus for introducing air into a liquid, and in particular it relates to a floating surface aerating apparatus.

It is known to use surface aerators for introducing a gas such as air into a liquid. Such apparatus, which is particularly useful in the treatment of waste material for introducing air, and hence oxygen into the liquid, normally comprises a plurality of blades, shovels or the like rotatable about either a vertical or a horizontal axis. It is also known to support such surface aerators on the surface of the liquid by floating means so that the aerating devices will remain at a uniform distance relative to the surface of the liquid regardless of the depth of the liquid. This floating means has normally comprised one or more floating bodies secured to the frame of the surface aerating apparatus.

However, this known apparatus has suffered from the disadvantage that the floating bodies supporting the apparatus, which have been located such that they either partially or wholly surround the aerating apparatus, significantly disturb the surface flow of liquid produced by the aerating apparatus. This significantly reduces the flow of the oxygen-rich liquid into the main body of the liquid, and hence into the oxygen-poor areas of the liquid. This of course significantly reduces the overall efficiency of the aerating apparatus. In addition, the said disturbance of the surface flow retards the circulation of liquid in the aeration tank as a whole and thus increases the possibility of undesired sludge formation.

Thus, there exists a need for an apparatus wherein the advantages of a floating surface aerating apparatus may be achieved but wherein the overall efficiency of the apparatus is not impaired.

SUMMARY OF THE INVENTION

Thus, it is a purpose of this invention to provide a new and improved floating surface aerating apparatus which overcomes disadvantages of such apparatus known heretofore.

In particular, it is a purpose of this invention to provide a new and improved floating surface aerating apparatus wherein the floating means for supporting the apparatus itself does not significantly reduce the efficiency of the surface flow created by the apparatus.

The purposes of the present invention are achieved by immersing a major portion of the buoyancy volume into the body of liquid below the area of surface flow and providing several additional floating members at the surface of the liquid primarily to stabilize the apparatus. With this arrangement, the major portion of the buoyancy volume will not disturb the surface flow of the liquid.

In accordance with a preferred embodiment of the invention, the aerating apparatus comprises a plurality of radially extending blades or shovels rotatable about a vertical axis. The immersed buoyant body may be generally annular in shape, surrounding the said vertical axis. A plurality of relatively small stabilizing floating members located on the surface of the liquid are spaced about the apparatus and connected thereto by suitable support means. Although the immersed buoyant body and the stabilizing floating members can be formed as a single unit, it is preferable that they be individual units connected together by suitable support means. With this latter arrangement it is possible to minimize the disturbing effect of the units on the flow conditions as it is possible to provide the main buoyant body at a specified distance below the blades of the aerating apparatus and to arrange the stabilizing floating members on supports spaced a radial distance from the periphery of the blades or shovels.

An advantageous result made possible by locating the major portion of the buoyant volume below the liquid surface is that it permits greater freedom in designing the remaining buoyant volume, namely the stabilizing floating members for reducing their effect on the surface flow. For example, these floating members may be constructed with a steamline, elongated shape and arranged with their axis of elongation generally parallel to the direction of the surface flow passing the said members.

Also, the major buoyancy volume in the form of an immersed buoyant body located below the aerating apparatus may be designed to influence the flow of liquid upwardly into the rotating blades.

The free space surrounded by the annular immersed buoyant body may include therein a baffle arrangement. Preferably, this baffle arrangement will impart a screw-shaped torque to the fluid passing therethrough contrary to the direction of rotation of the aerating apparatus. This will increase the efficiency of the aerating apparatus and also eliminate sludge collection in the tank.

With a surface aerating apparatus according to the present invention, it is also possible to design the system to be thrust free in the direction of said vertical axis. This can be achieved by forming the shovels or blades, and also the baffles such that the axial thrust components produced by the various surfaces offset each other.

Thus, it is a purpose of this invention to provide a new and improved floating surface aerating apparatus.

It is another object of this invention to provide a new and improved floating surface aerating apparatus wherein the buoyancy volume is arranged such that its detrimental effect on the produced surface flow is minimized.

It is a further object of this invention to provide a floating surface aerating apparatus wherein the buoyancy volume is arranged such that it does not disturb the produced surface flow and such that it may positively and favorably influence the flow of liquid through the aerating apparatus.

It is another object of this invention to provide a floating surface aerating apparatus wherein the major portion of the buoyancy volume is located below the area of surface flow.

Other objects and the intended advantages of the present invention will become apparent from the detailed description to follow together with the accompanying drawings.

BRIEF DESCRIPTION OF THE DRAWINGS

There follows a detailed description of preferred embodiments of the present invention, together with accompanying drawings. However, it is to be understood that the detailed description and the drawings are provided only to illustrate a preferred embodiment of the invention.

FIG. 3 is a plan view similar to FIG. 2 but reduced in size and showing a modification.

FIG. 4 is a partial sectional view showing another modification of the invention.

FIG. 5 is a partial sectional view showing still another modification of the invention.

FIG. 6 is a sectional view taken along line 6—6 of FIG. 5.

DETAILED DESCRIPTION OF THE PREFERRED EMBODIMENTS

Figure 1:
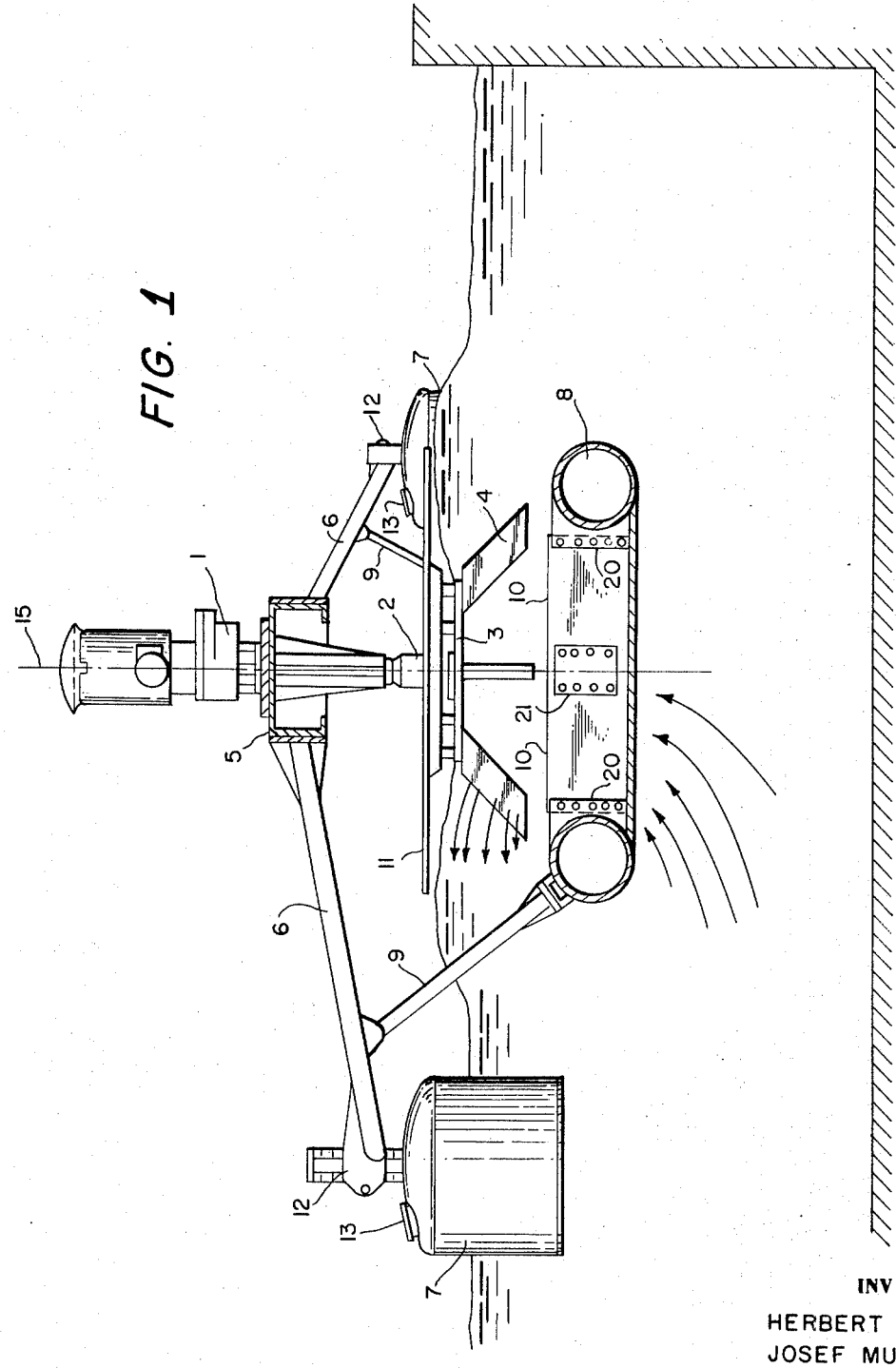
FIG. 1 is a side elevational view of an aerating apparatus constructed in accordance with the present invention, with the lower portion of the apparatus in section and taken through the plane of the line 1—1 of FIG. 2.

Referring now to the drawings, like elements are represented by like numerals throughout the several views.

Figure 2:
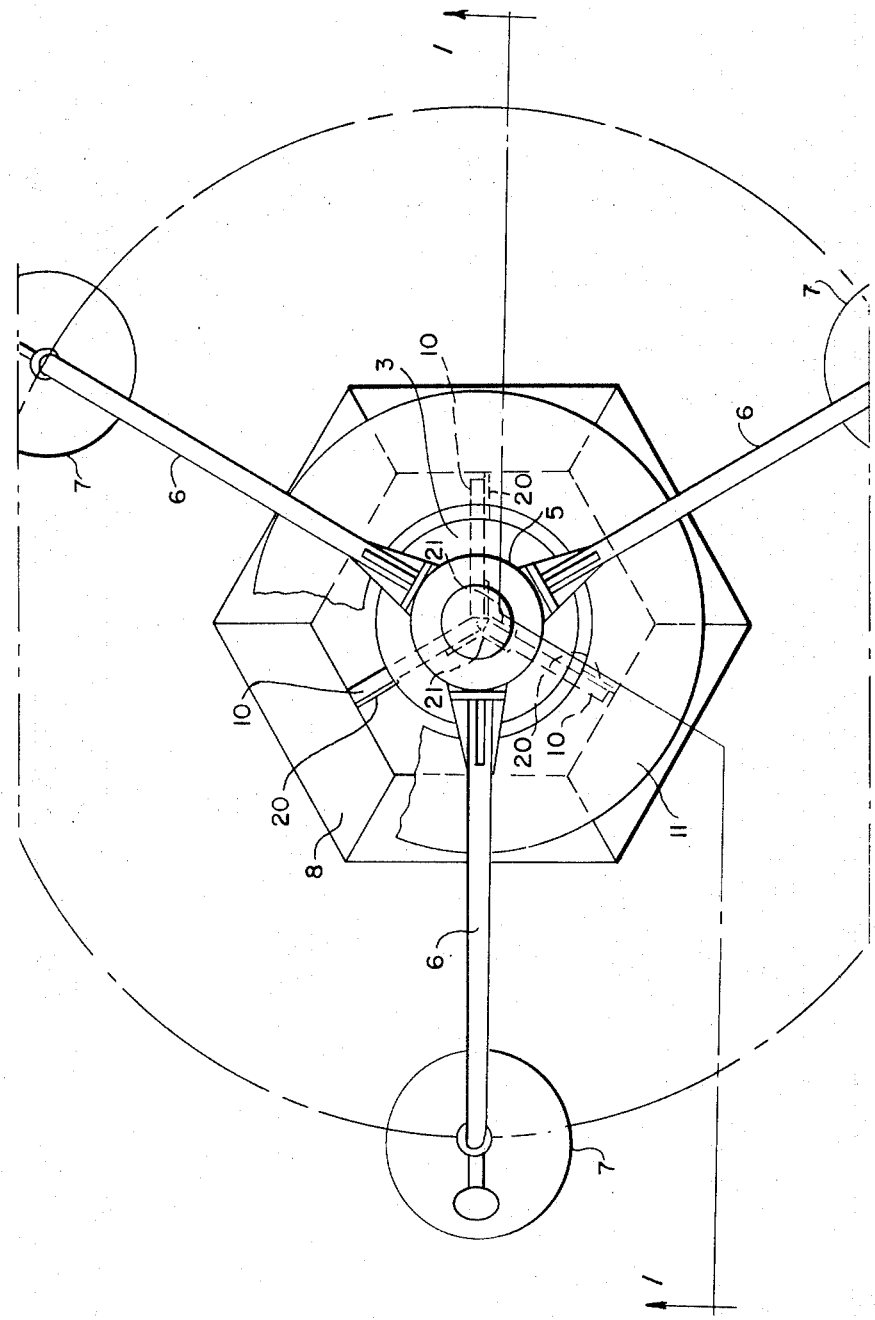
FIG. 2 is a plan view of FIG. 1 with a portion of the apparatus cut away to show further details.

Referring specifically to FIGS. 1 and 2, the apparatus includes a driving motor 1 connected through a suitable coupling 2 to an aerating wheel 3 to which are connected a plurality of radially extending blades or shovels 4 which are located just below the surface of the liquid. As the elements 2, 3 and 4 are rotated about vertical axis 15, the blades 4 act as a centrifugal aerator causing the liquid to flow outwardly at the surface as indicated by the arrows in FIG. 1. This of course creates a further flow upwardly from the bottom of the tank into the blades as indicated by the lower arrows in FIG. 1. This latter upward flow is of course created by a subatmospheric pressure which occurs at the center of the apparatus as the blades cause the liquid passing thereby to be directed outwardly. Oxygenation, or the introduction of the surrounding air into the liquid is created primarily through the suction whirls produced by the blades as they pass through the liquid. With this type of aerating apparatus, the free development of the surface flow is particularly important and any impediment to that flow will substantially reduce the overall efficiency of the apparatus. Thus, it is a feature of the present invention that the supporting structure will not impede this free surface flow.

The support means for the aerating apparatus comprises a non-rotating support ring 5 to which are connected a plurality of radial support members 6, each including at its outer end a stabilizing floating member 7. These floating members may include an inlet opening 13 for adding liquid to vary the buoyant volume of the floating member. Also, each member 7 may be adjusted vertically with respect to its radial support member 6 by means of a vertical adjusting element 12.

The main purpose the members 7 is to provide lateral stability to the overall apparatus. The major buoyant force is provided by the immersed buoyant body 8 which is suitably connected to the radial support member 6 by suitable strut members 9. Although this buoyant body 8 may be of any suitable shape, in a preferred embodiment of the invention it is arranged as an annular polygonal ring formed concentrically about the vertical axis 15 and arranged at such a distance below the blades 4 of the aerating apparatus that it does not disturb the surface flow created by said apparatus. Further, because of the annular shape of the buoyant body, it does not adversely affect the development of the upward flow of liquid into the aerating apparatus.

Since the floating members 7 comprise only a minor portion of the overall buoyant volume, they may be relatively small and they may be arranged at a relatively large distance from the axis of the aerating apparatus. Thus, in a simplified embodiment of the invention, they may be simple circular bodies. However, it is also possible to further reduce even this minor effect of the floating members on the surface flow by designing these members in a steamlined shape (as viewed in the plan view). Such an arrangement is shown in FIG. 3. In this embodiment the members 7a are elongated and set at an angle $\theta$ with respect to a tangent through the member 7a. The floating members 7a are thus aligned with the spiral-shaped outward surface flow of the liquid.

In accordance with a further modification of the invention, the buoyant body 8 can be given a shape which facilitates the upward flow of liquid into the aerating apparatus. Such an arrangement is shown at 8a in FIG. 4.

According to a further feature of the invention, a baffle arrangement may be positioned within the free space surrounded by the generally annular shaped immersed buoyant body 8 (or 8a) for influencing the flow of liquid upwardly through the immersed buoyant body of the aerating apparatus. FIGS. 1, 2 and 4 illustrate an arrangement including a plurality of radially extending baffles 10. However, the baffles can also have other suitable shapes. For example, they may extend annularly, in a spiral, etc. with respect to the axis 15. These baffles may be used to influence the rising liquid in any desirable manner. For example, it may be advantageous to reduce turbulence with baffles extending parallel to the axis 15. Alternatively, the baffles may be curved as shown in FIGS. 5 and 6, thereby imparting to the rising liquid a rotational component in a direction opposite to the direction of rotation of the aerating apparatus, as shown by the arrow 14 in FIG. 5. The rotational component of the surface flow produced by the aerator apparatus gradually affects the overall circulation within the tank so that the liquid returning to the aerating apparatus from the bottom of the basin flows in a spiral path so that the liquid rising through the immersed buoyant body 8 forms a whirl as it enters the aerating apparatus. With the design of the baffles 10a as shown in FIGS. 4 and 5, the rotational component of the flow can be retarded, and even reversed, as indicated by the vector diagram in FIG. 5 of the inlet velocity $c_r$ and the outlet velocity $c_u$. With this arrangement, the speed of the blades 4 relative to the entering liquid is increased thereby increasing the efficiency of the aerating apparatus.

Although the baffles may be connected by any suitable means, in the embodiment of FIGS. 1 and 2, the baffles are connected together by connecting plates 21 and the baffles are connected to the immersed buoyant body 8 by suitable connecting plates 20.

The aerating apparatus also includes a baffle plate 11 for receiving liquid thrown upwardly by the blades and directing the same outwardly.

This exerts an upward axial thrust on the apparatus. However, this thrust may be eliminated by omitting the baffle plate 11.

Although the invention has been described in considerable detail with respect to a preferred embodiment, it should be apparent that the invention is capable of numerous modifications and variations apparent to those skilled in the art. For example, it is also within the scope of the invention to utilize the concept of locating the major buoyant force in combination with the type of aerating apparatus having a plurality of rotors, shovels or the like rotating about a horizontal axis. In this case, the major buoyant force may be provided, for example, by one or more cylindrical bodies having their axes parallel to the direction of surface flow and located below the level of surface flow and offset to the sides of such flow. Alternatively, the major portion of the buoyant volume could be arranged below the aerating apparatus and parallel to the axis thereof.

We claim

1. An aerating apparatus comprising, an aerating means for introducing air into a liquid by agitating the liquid to create a flow in the surface of the liquid in a direction outwardly from the central part of the aerating means, a support means in the body of liquid for supporting the aerating means, said support means comprising a buoyant body having sufficient buoyancy to support a major portion of the weight of the aerating means to position the same on the surface of the liquid in position to create said surface flow, the entire buoyant body being immersed in the body of liquid completely below the surface of the liquid, substantially below the path of said outward surface flow so that the buoyant body does not disturb said surface flow, the said support means further comprising stabilizing floating means which are relatively small thus minimizing their disturbing effects on surface flow conditions and are located on the surface of the liquid radially outwardly of the said aerating means wherein the remainder of the weight of the aerating means is supported by said stabilizing floating means.

2. An aerating apparatus according to claim 1, wherein said aerating means includes blades mounted for rotation about a vertical axis, and wherein said buoyant body comprises a generally annular immersed body located below said blades and surrounding said axis.

3. An aerating apparatus according to claim 2, wherein said stabilizing floating means comprises a plurality of stabilizing members floating on the surface of the liquid.

4. An aerating apparatus according to claim 3, wherein said support means includes strut members supporting the buoyant body at a certain vertical distance below the said blades, and radial support members for supporting said stabilizing floating members at a certain horizontal distance radially outwardly from said blades, relative to said axis.

5. An aerating apparatus according to claim 2, wherein said stabilizing floating members are generally streamlined to facilitate the flow of agitated surface liquid past the same with minimal flow resistance.

6. An aerating apparatus according to claim 2 wherein the buoyant body has a generally streamlined cross-sectional shape to facilitate the flow of liquid upwardly to said aerating means.

7. An aerating apparatus according to claim 2, including baffle means, operatively assciated with said buoyant body for influencing the direction of liquid flow upwardly past said annular member to said aerating means.

8. An aerating apparatus according to claim 7 wherein the baffle means comprises a set of baffles located in the free space surrounded by said annular member. 12

9. An aerating apparatus according to claim 7, wherein said baffles lie in generally vertical planes and extend from said vertical axis radially outwardly to said annular member.

* * * * *